US008458616B2

(12) United States Patent
Kinouchi et al.

(10) Patent No.: US 8,458,616 B2
(45) Date of Patent: Jun. 4, 2013

(54) DATA DISPLAY METHOD AND REPRODUCTION APPARATUS

(75) Inventors: Takashi Kinouchi, Tokyo (JP); Hideo Tsukazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 941 days.

(21) Appl. No.: 11/416,121

(22) Filed: May 3, 2006

(65) Prior Publication Data

US 2008/0154953 A1 Jun. 26, 2008

(30) Foreign Application Priority Data

May 19, 2005 (JP) ................................ 2005-146818

(51) Int. Cl.
*G06F 17/30* (2006.01)
(52) U.S. Cl.
USPC ............................ 715/807; 715/716; 715/864
(58) Field of Classification Search
USPC .................................................. 715/807, 715
See application file for complete search history.

(56) References Cited

U.S. PATENT DOCUMENTS

| 6,839,309 | B1 | 1/2005 | Yunoki et al. | |
|---|---|---|---|---|
| 2002/0073070 | A1* | 6/2002 | Morita et al. | 707/1 |
| 2002/0077170 | A1* | 6/2002 | Johnson et al. | 463/16 |
| 2002/0078037 | A1* | 6/2002 | Hatanaka et al. | 707/3 |
| 2003/0021055 | A1 | 1/2003 | Tange et al. | |
| 2004/0201576 | A1* | 10/2004 | Shimada et al. | 345/173 |
| 2005/0021470 | A1 | 1/2005 | Martin et al. | |
| 2005/0149872 | A1* | 7/2005 | Fong et al. | 715/727 |
| 2005/0187976 | A1 | 8/2005 | Goodman et al. | |
| 2006/0008256 | A1* | 1/2006 | Khedouri et al. | 386/124 |
| 2006/0224962 | A1* | 10/2006 | Ostojic et al. | 715/716 |
| 2007/0027926 | A1 | 2/2007 | Kinouchi et al. | |

FOREIGN PATENT DOCUMENTS

| EP | 1 385 170 A1 | 1/2004 |
|---|---|---|
| EP | 1 610 330 A2 | 12/2005 |
| JP | 2000-307998 | 11/2000 |
| JP | 2001-76415 | 3/2001 |
| JP | 2001-101832 | 4/2001 |
| JP | 2001-195412 | 7/2001 |
| JP | 2004-38896 | 2/2004 |
| JP | 2004-78815 | 3/2004 |
| JP | 2004-289776 | 10/2004 |
| JP | 2005-98831 | 4/2005 |

OTHER PUBLICATIONS

U.S. Appl. No. 11/584,674, filed Oct. 23, 2006, Kinouchi.
U.S. Appl. No. 11/435,807, filed May 18, 2006.
U.S. Appl. No. 11/446,146, filed Jun. 5, 2006, Kinouchi.
"Windows Media Player 9 Series", Microsoft Corporation, XP002401565, 2002, pp. 1-115.

(Continued)

*Primary Examiner* — Andrea Leggett
(74) *Attorney, Agent, or Firm* — Oblon, Spivak, McClelland, Maier & Neustadt, L.L.P.

(57) ABSTRACT

To provide a data display method for displaying an attribute item information linked to a content data on a display screen, having the following steps of: displaying a list including an attribute item information respectively allocated to a plurality of content data in a predetermined region of the display screen, and displaying, when a predetermined attribute item information is selected for reproduction from the list, the list and a plurality of attribute item information linked to a content data corresponding to the selected attribute item information in part of the predetermined region.

19 Claims, 10 Drawing Sheets

OTHER PUBLICATIONS

"Microsoft Released Windows Media Player 9", The Brill Report, http://www.tcf.net/media9.html, XP002318894, Sep. 10, 2002, 2 pages.

"Windows Media Player", Microsoft Corporation, XP002401566, 2002, 5 cover pages and pp. 1-177.

* cited by examiner

| MUSIC DATA ID | ARTIST NAME (ARTIST ID) | ALBUM NAME (ALBUM ID) | TRACK NAME (TRACK ID) |
|---|---|---|---|
| M_D1 | AR_N1 | AL_N1 | T_N1 |
| M_D2 | AR_N1 | AL_N1 | T_N2 |
| M_D3 | AR_N2 | AL_N2 | T_N3 |
| M_D4 | AR_N3 | AL_N3 | T_N4 |
| M_D5 | AR_N4 | AL_N4 | T_N5 |
| ... | ... | ... | ... |

TABLE

DATA DISPLAY METHOD AND REPRODUCTION APPARATUS

CROSS REFERENCE TO RELATED APPLICATION

The present invention contains subject matter related to Japanese Patent Application No. 2005-146818 filed in the Japan Patent Office on May 19, 2005, the entire content of which being incorporated herein by reference.

BACKGROUND OF THE INVENTION

1. Field of the Invention

The present invention relates to a data display method for displaying a content data on a reproduction screen and a reproduction apparatus.

2. Description of the Related Art

In recent years, advances in technology increasing the capacity of recording media and compressing music, moving images, still images, and other data have enabled the recording media used in a portable audio reproduction apparatus to store enormous amounts of music data.

Such portable audio reproduction apparatus is provided with for example a liquid crystal display, and causes its reproduction screen to display only attribute names such as title, artist name, album name of a producing music data due to a restriction on a space.

This is described for example in Japanese Unexamined Patent Publication (Kokai) No. 2001-76415.

SUMMARY OF THE INVENTION

The above described portable audio reproduction apparatus is demanded to inform a user of not only the producing music data but a music data to be subsequently reproduced by the reproduction screen.

There is the same demand in a reproduction apparatus for reproducing a content data such as an image data other than the music data.

To satisfy the above demand, it is therefore desirable to provide a data display method and a reproduction apparatus capable of effective displaying an information informing a user of a content data to be reproduced other than the reproducing content data.

According to an embodiment of the present invention, there is provided a data display method for displaying an attribute item information linked to a content data on a display screen, having the following steps of: displaying a list including an attribute item information respectively allocated to a plurality of content data in a predetermined region of the display screen; and displaying, when a predetermined attribute item information is selected for reproduction from the list, the list and a plurality of attribute item information linked to a content data corresponding to the selected attribute item information in part of the predetermined region.

According to an embodiment of the present invention, there is provided a reproduction apparatus for reproducing a content data, having: a reproduction unit configured to reproduce a content data; a display unit configured to display an information associated with the content data; and a control unit connected to the display unit through a bus, and configured to cause the display unit to display in a predetermined section a list including an attribute item information respectively allocated to a plurality of content data, and, when detecting that a predetermined attribute item information is selected for reproduction from the list, cause the display unit to display the list and a plurality of other attribute item information linked to a content data corresponding to the selected attribute item information in part of the predetermined region.

According to the reproduction apparatus of the embodiment of the present invention, it is possible to effectively display information informing a user of a content data to be reproduced other than the reproducing content data.

BRIEF DESCRIPTION OF THE DRAWINGS

The above and other features of embodiments of the present invention will be apparent in more detail with reference to the accompanying drawings, in which.

DESCRIPTION OF THE PREFERRED EMBODIMENTS

Preferred embodiments according to the present invention will be described in more detail with reference to the drawings.

First, a relationship between components of the present embodiments and components of the present invention will be explained.

A music data of the present embodiments is an example of the content data according to the present invention.

Each of a genre, an artist, and an album of the present embodiments is an example of the attribute and each item of the attributes is an example of the attribute item according to the present invention.

Figure 4:
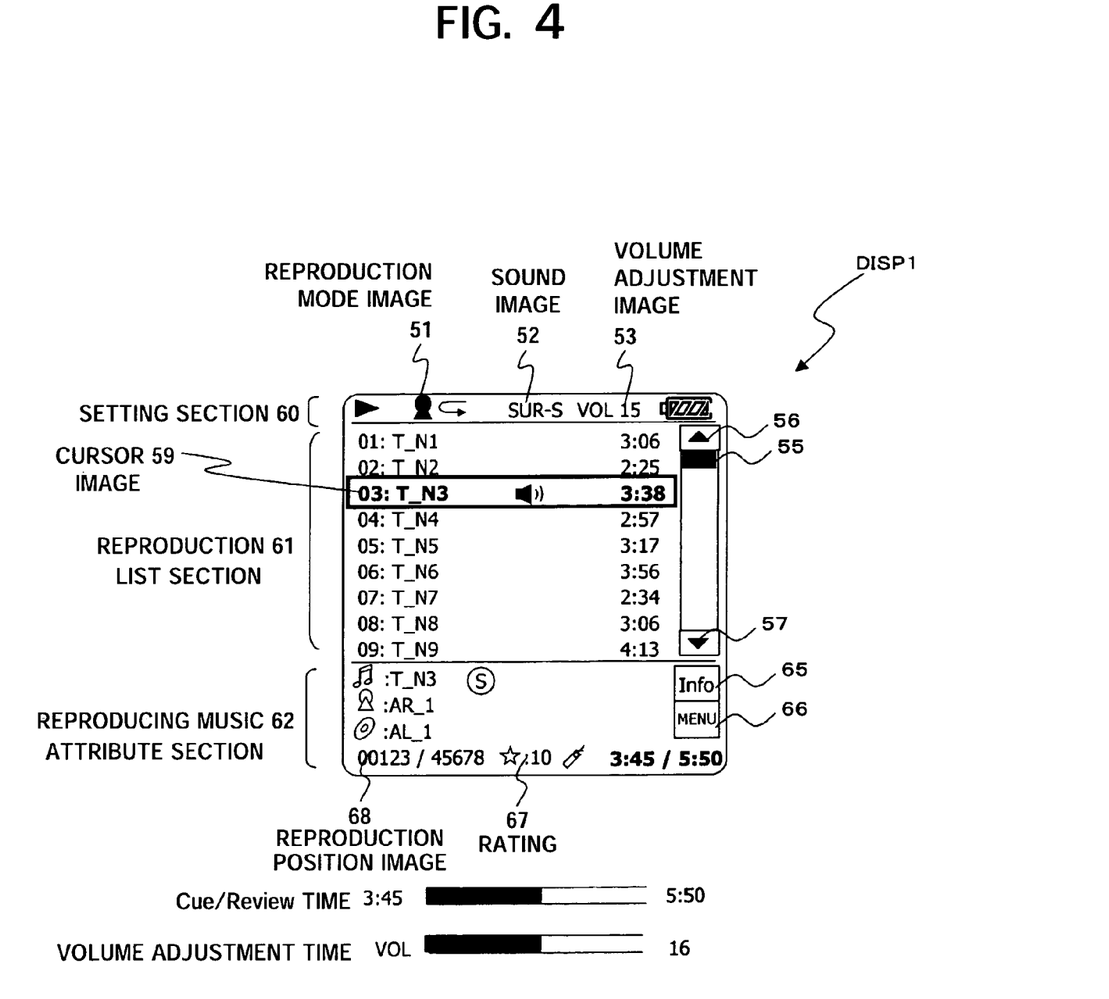
FIG. 4 is a view for illustrating a reproduction screen displayed on a liquid crystal display (LCD) panel shown in FIG. 1.

Further, a reproduction list section 61 shown in FIG. 4 is an example of the first section and a reproducing music attribute section 62 is an example of the second section according to the present invention.

Hereinafter, a reproduction apparatus of the present embodiment according to the present invention will be explained.

Figure 1:
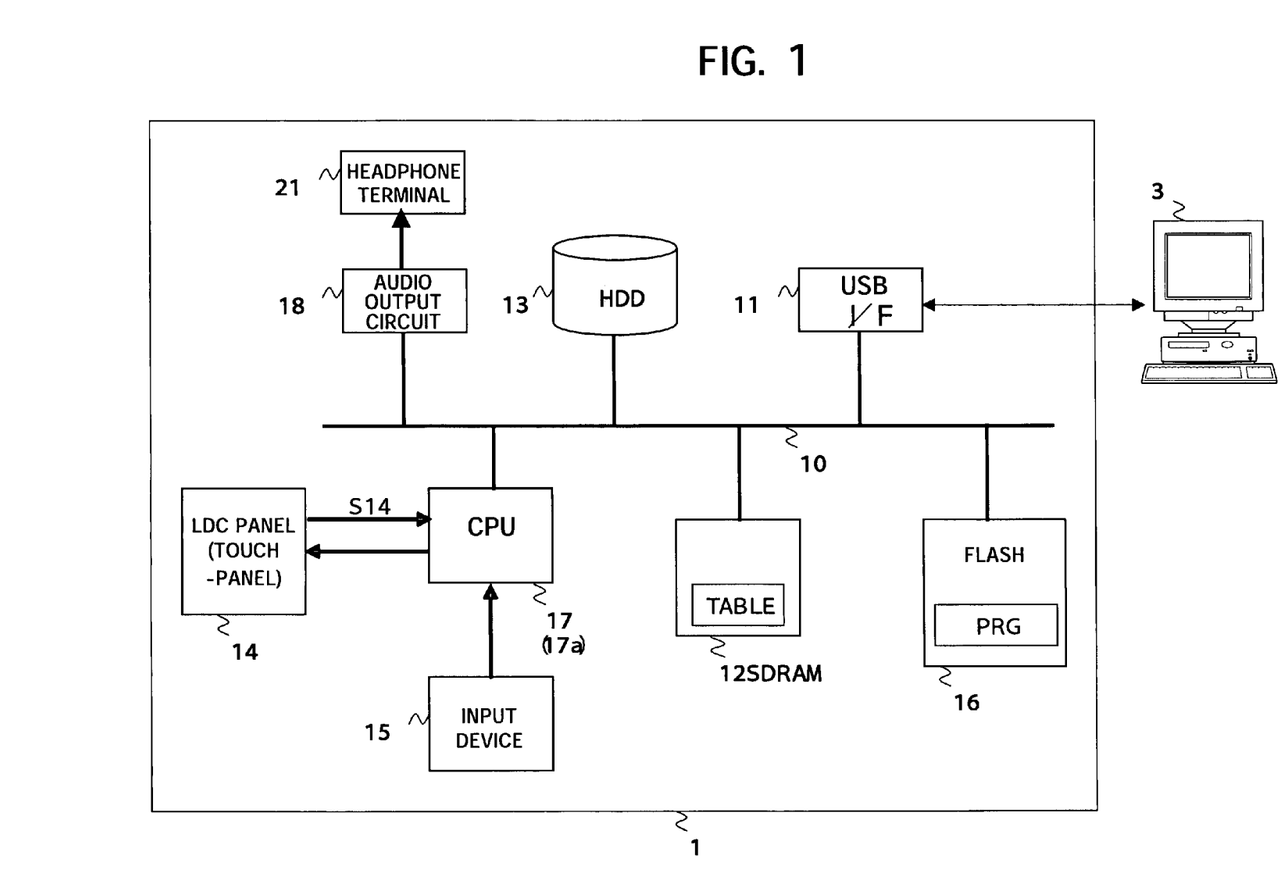
FIG. 1 is a view of a configuration of a portable audio reproduction apparatus according to an embodiment of the present invention.

FIG. 1 is a view of a configuration of a portable audio reproduction apparatus 1 of the present embodiment according to the present invention.

The portable audio reproduction apparatus 1, as shown in FIG. 1, for example has a universal serial bus (USB) interface 11, a synchronous dynamic random access memory (SDRAM) 12, a hard disk drive (HDD) 13, a liquid crystal display (LCD) panel 14, an input device 15, a flash memory 16, a central processing unit (CPU) 17, and an audio output circuit 18.

The USB interface 11, the SDRAM 12, the HDD 13, the flash memory 16, the CPU 17, and the audio output circuit 18 are for example connected through a data line 10.

The USB interface 11 is connected to a personal computer 3 and inputs and outputs data with the personal computer 3. Note that, as the interface used for connecting the personal computer or other exterior equipments, not only a wired interface but a wireless interface can be used.

The SDRAM 12 temporarily stores data for processing of the CPU 17.

The HDD 13 stores compressed or uncompressed music data.

The music data is written via the USB interface 11 from the personal computer 3 to the HDD 13.

The HDD 13 has for example a storage capacity of 20 GB and can store a music data of almost 100 million tracks (700 compact disks' worth of data) compressed by adaptive transform acoustic coding (ATRAC) 3 etc.

Figure 2:
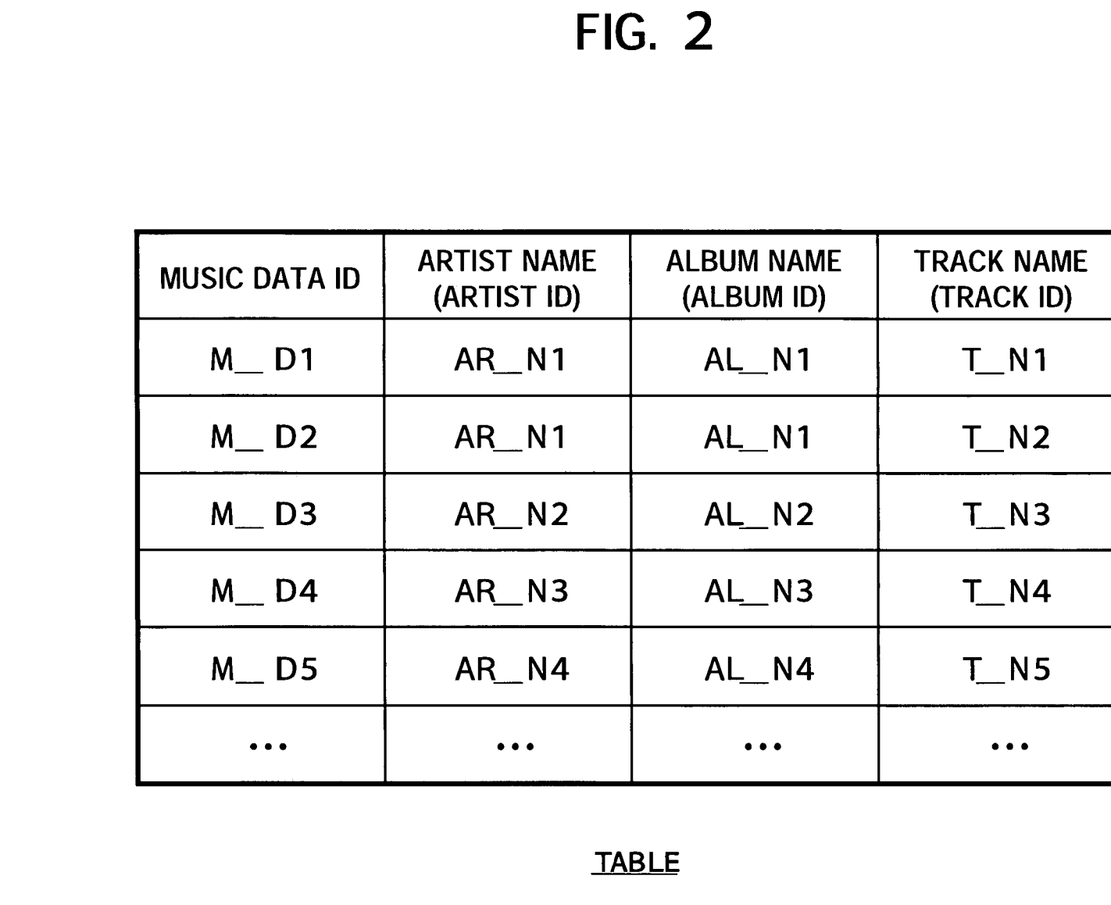
FIG. 2 is a view for illustrating attributes allocated to a music data stored in the portable audio reproduction apparatus shown in FIG. 1.

Each track's worth of the music data stored in the HDD 13 (hereinafter simply referred to as "music data") is linked by a management data TABLE to an identification data M_ID, an artist name data AR_N, an album name data AL_N, and a track name data T_N as shown in FIG. 2.

The management data TABLE is stored in the HDD 13 and read out by the SDRAM 12 for example at starting the portable audio reproduction apparatus 1.

Figure 3A:
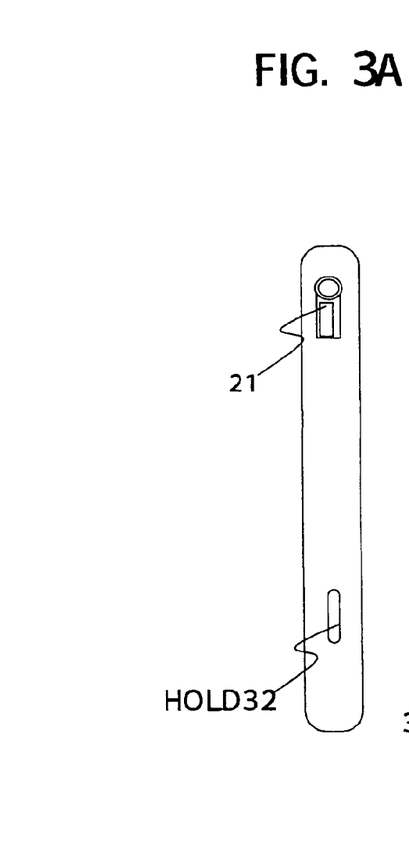
FIGS. 3A to 3C are views for illustrating an outline of the portable audio reproduction apparatus shown in FIG. 1.
Figure 3B:
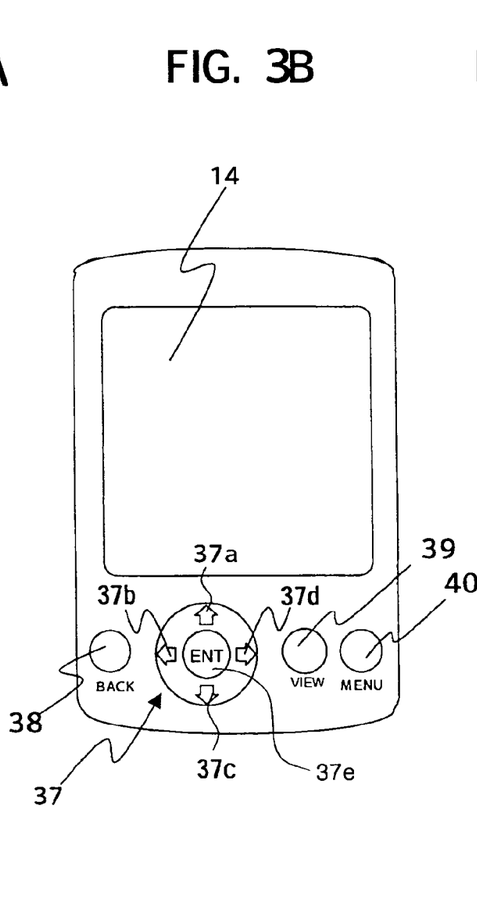

The LCD panel 14 is positioned at a front of the housing of the portable audio reproduction apparatus 1 as shown in FIG. 3B.

The LCD panel 14 displays various screens by the CPU 17.

As the screens displayed on the LCD panel 14, there are for example mainly a menu screen, a selection screen, a setting screen, and a reproduction screen. These screens switch (transit) in accordance with key operation by the user.

Further, the LCD panel 14 may be a touch-panel, which detects on the screen a position touched by a user with a finger and outputs a detected position signal S14 indicating the position to the CPU 17.

The LCD panel 14 may be an organic electroluminescence (EL) display for example.

Figure 3C:
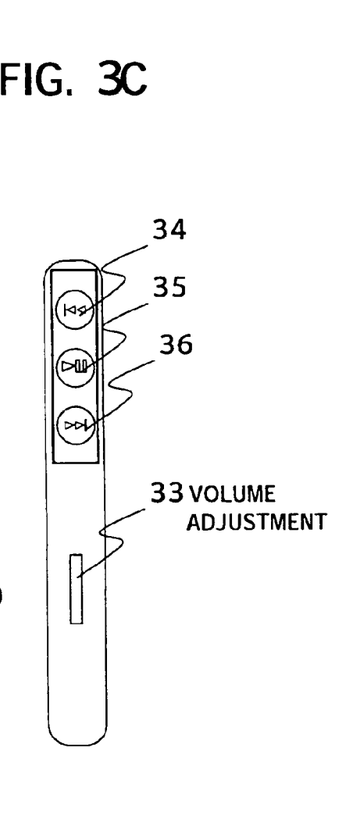

The input device 15 as shown in FIG. 3 includes the keys provided at the housing of the portable audio reproduction apparatus 1 and operated by a user.

The input device 15 inputs data by a touch-panel function of the LCD panel 14.

As shown in FIG. 3A, a headphone terminal 21 and a HOLD key 32 are provided at one side surface of the portable audio reproduction apparatus 1.

As shown in FIG. 3B, the LCD panel 14, a BACK key 38, a direction key 37, a VIEW key 39, and a MENU key 40 are provided at a front of the portable audio reproduction apparatus 1.

The direction key 37 has an up direction key 37a moving a cursor in an upward direction of the screen, a left direction key 37b moving the same in a leftward direction (lower hierarchy), a down direction key 37c moving the same in a downward direction, a right direction key 37d moving the same in a rightward direction (upper hierarchy), and an execute key 37e inputting a reproduction instruction or other execute instructions.

As shown in FIG. 3C, a fast-return key 34, a reproduction and pause key 35, a fast-forward key 36, and a volume adjustment dial 33 are provided at a side surface of the portable audio reproduction apparatus 1.

The flash memory 16 for example stores a program PRG defining the operation of the CPU 17.

The audio output circuit 18 outputs an audio signal corresponding to the music data decoded by the CPU 17 to the headphone terminal 21.

The CPU 17 centrally controls the operation of the reproduction apparatus 1 based on the program PRG read out from the flash memory 16.

Further, the CPU 17 reads out the selected music data from the HDD 13, decodes it, and reproduces it.

The CPU 17 for example allows the LCD panel 14 to display the reproduction screen DISP1 shown in FIG. 4.

The reproduction screen DISP1 for example includes a setting section 60, a reproduction list section 61, and a reproducing music attribute section 62 as shown in FIG. 4.

The setting section 60 for example includes a reproduction mode image 51, a sound image 52, and volume adjustment image 53 as shown in FIG. 4.

The reproduction mode image 51 for example is an image indicating a designated reproduction mode. As the reproduction mode, for example an artist reproduction mode, an album reproduction mode, and a shuffled reproduction mode could be designated.

The sound image 52 is an image indicating a designated sound mode. In the present embodiment, as a sound mode, a normal mode, a pops mode, a jazz mode, a studio mode, and a live mode could be designated.

The volume adjustment image 53 is an image indicating a designated volume.

The reproduction list section 61 is successively displayed (arranged) with title name data of a plurality of the music data selected for reproduction in the designated reproduction mode.

The reproduction list section 61 is displayed with a reproduction time data of the music data linked to the respective title name data.

The reproduction list section 61 is displayed with a cursor image 59 on the title name data and the reproduction time data of the reproducing music data.

Further, the reproduction list section 61 has a function button image 56 for moving the cursor image 59 in an upward direction of the screen, a function button image 57 for moving the same in a downward direction, and a function button image 55 for moving the same by dragging, in the screen on right side.

The CPU 17 allows the LCD panel 14 to display in the reproduction list section 61 the title name data of a plurality of music data including the reproducing music data and a prior and posterior music data by a predetermined number with respect to the reproducing music data in a reproduction order when the number of music data to be produced exceeds to a predetermined number.

The reproducing music attribute section 62 is displayed with a title name data, an artist name data and an album name data of the reproducing music data.

Further, the reproducing music attribute section 62 for example is displayed with an information display image 65 and a menu display image 66.

The information display image 65 for example is an image for allowing a predetermined information associated with the reproducing music data to be displayed in response to a designation.

The menu display image 66 is an image for transiting the existing screen to the menu screen.

A rating 67 and a reproduction position image 68 are displayed at a lower end portion of the screen.

The rating 67 is an evaluated information given from a user based on a user's preference.

The reproduction position image 68 is an image indicating a present reproduction timing per total reproduction time of the reproducing music data.

Figure 5:
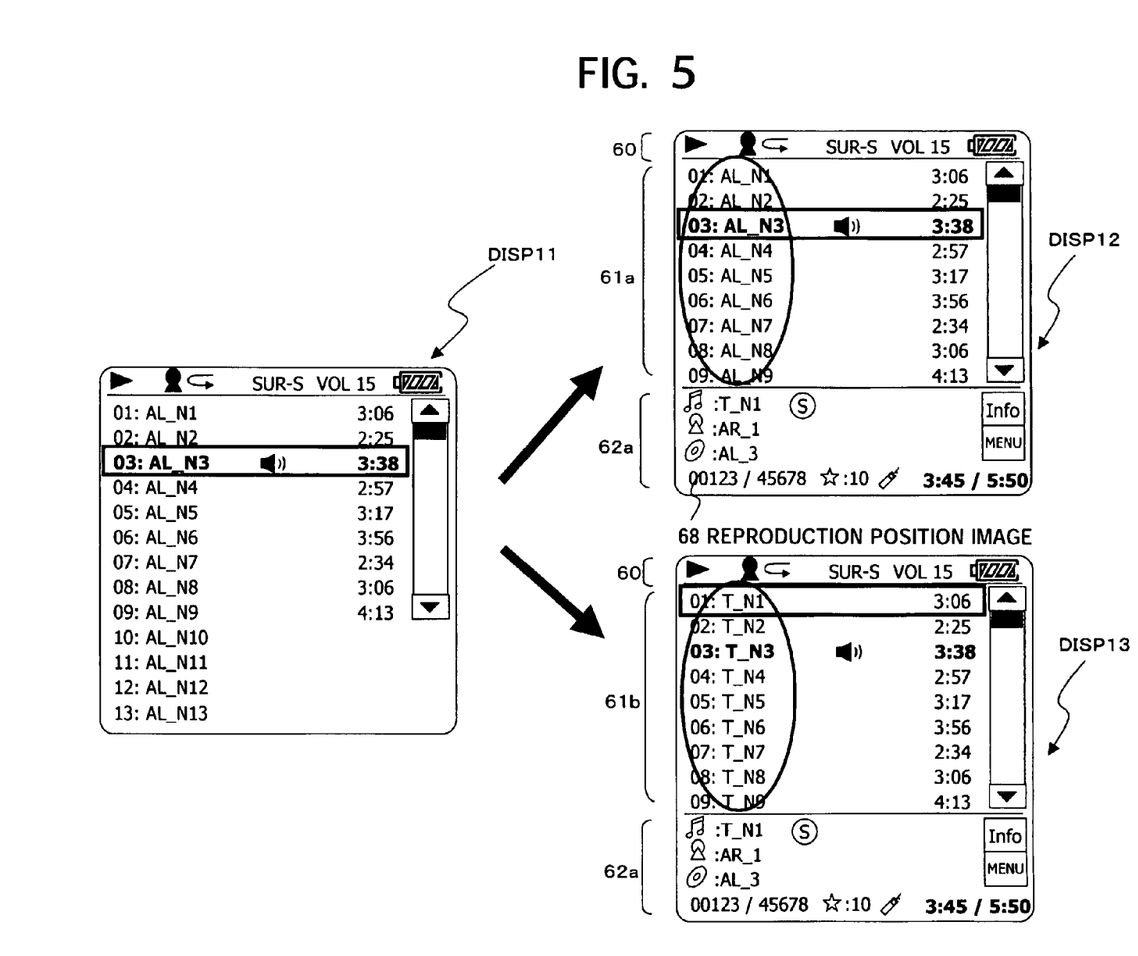
FIG. 5 is a view for illustrating reproduction screens displayed on the LCD panel shown in FIG. 1.

The CPU 17, for example as shown in FIG. 5, when the cursor image is moved on the album list screen DISP11 to designate an album and a reproduction instruction is received as input, reproduces the music data belonging to the designated album successively from the beginning.

At this time, the CPU 17 for example causes the LCD panel 14 to display a reproduction screen DISP12 shown in FIG. 5.

The reproduction screen DISP12 as shown in FIG. 5 is displayed with a reproduction list section 61a indicating part of the album list displayed in the album list screen DISP11 and a reproducing music attribute section 62a of the reproducing music data.

Namely, in this example, the CPU 17 causes the LCD panel 14 to display in the reproduction list section 61a an information associated with the attribute displayed at a timing where a reproduction instruction is received as input.

The CPU 17 for example causes the LCD panel 14 to display in the reproduction list section 61a an information associated with a genre or artist when the reproduction instruction is received as input on a search (music select) screen based on the genre and artist.

Note that, the CPU 17 for example causes the LCD panel 14 to display a reproduction screen DIS13 shown in FIG. 5.

The reproduction screen DISP13 is displayed with a reproduction list section 61b indicating a title name data of the music data belonging to the designated album, and a reproducing music attribute section 62a of the reproducing music data.

Next, examples of the operation of the portable audio reproduction apparatus 1 shown in FIG. 1 will be explained.

First Operation Example

In this example of the operation, the case where the reproduction instruction is received as input will be explained.

Figure 6:
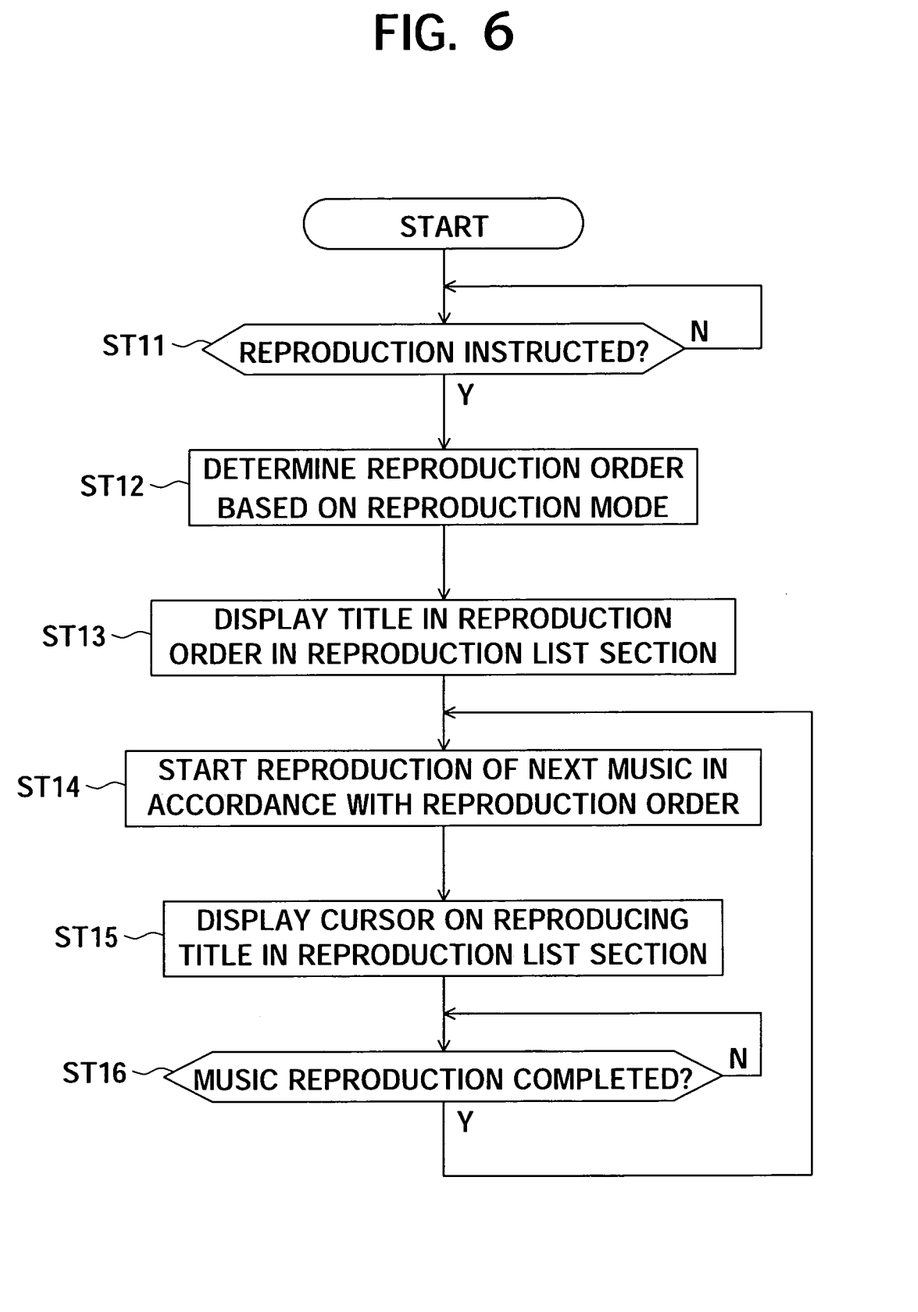
FIG. 6 is a flow chart for illustrating an exemplary operation of the portable audio reproduction apparatus shown in FIG. 1 when receiving a reproduction instruction.

FIG. 6 is a flow chart for illustrating the example of the operation of the portable audio reproduction apparatus 1 shown in FIG. 1.

Step ST11

When the CPU 17 decides that the reproduction instruction is received as input, the routine proceeds to step ST12.

Note that, the reproduction instruction is generated by the execute key 37e being operated shown in FIG. 3 in a predetermined hierarchy while the CPU 17 causes the LCD panel 14 to display a predetermined search screen for example.

Otherwise, the reproduction instruction is generated by depressing the reproduction and pause key 35 placed on the side surface of the body shown in FIG. 3C.

The CPU 17 for example causes the LCD panel 14 to display the artist list screen, the album list screen shown in FIG. 5, the genre list screen, the truck list screen, or other search screens successively in response to user's operation.

The CPU 17 receives as input the reproduction instruction while the attribute item such as an artist, an album, a genre, or a track is designated on any one of the above search screens.

Step ST12

The CPU 17 for example decides the music data to be reproduced and the reproduction order thereof based on the reproduction mode set by the MENU key 40 shown in FIG. 3 and a hierarchy positioned in the search screen at step ST11 where the reproduction instruction is input.

The CPU 17, for example when the reproduction instruction is received as input while a predetermined artist name is designated on the search screen, decides to reproduce the music data corresponding to the designated artist name in a predetermined order, for example, in a released-day order, which is an order based on released days of the content data.

Further, the CPU 17, when the reproduction instruction is received as input while the shuffle mode is designated, randomly decides the reproduction order of the entire music data stored in the HDD 13.

Step ST13

The CPU 17 causes the LCD panel 14 to display the title name data and the reproduction time data of the music data in the reproduction order determined at step ST12, in the reproduction list section 61 of the reproduction screen DISP1 shown in FIG. 4.

Step ST14

The CPU 17 specifies the following music data to be reproduced in accordance with the reproduction order decided at step ST12, starts the reproduction (decoding) of the specified music data, and outputs the decoded data to the audio output circuit 18.

Step ST15

The CPU 17 as shown in FIG. 4 causes the cursor screen 59 to be positioned on the title name data and the reproduction time data of the reproducing music data in the reproduction list section 61.

Step ST16

The CPU 17 decides whether or not the reproduction of the music data is completed, when deciding it is completed, the routine returns to step ST14.

Second Operation Example

In this example of the operation, the case where a predetermined title name data is dragged and dropped, or instructed to be deleted in response to a touch-panel operation from a user in the reproduction list section 61 of the reproduction screen DISP1 shown in FIG. 4, will be explained.

Figure 7:
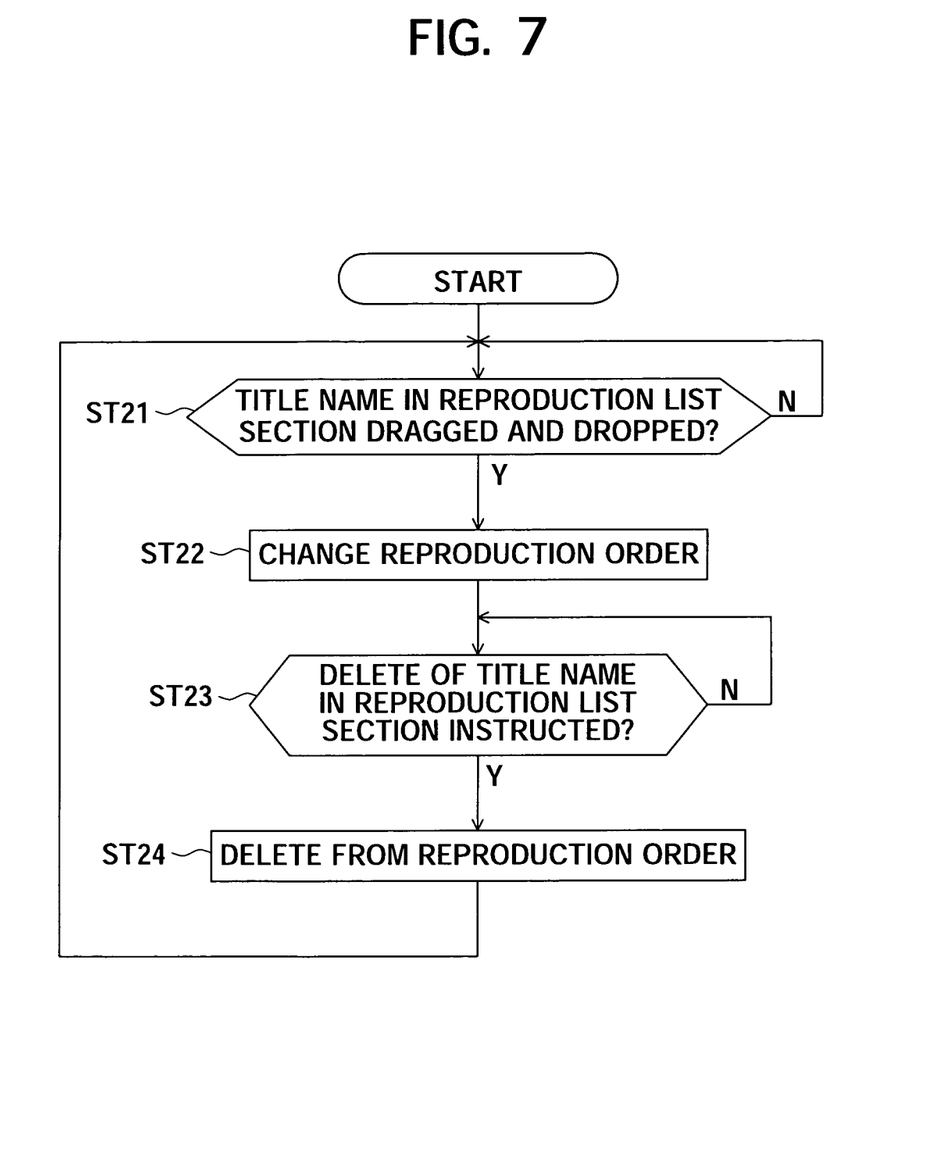
FIG. 7 is a flow chart for illustrating an exemplary operation of the portable audio reproduction apparatus when receiving a drag movement instruction or delete instruction to a predetermined title data in response to a touch-panel operation by a user in a reproduction list section of a reproduction screen DISP1 shown in FIG. 4.

FIG. 7 is a flow chart for illustrating this example of the operation.

Step ST21

The CPU 17 decides whether or not the title name data is dragged and dropped in the reproduction list section 61 of the reproduction screen DISP1 shown in FIG. 4 based on an operation signal in accordance with the touch-panel operation of the LCD panel 14, when deciding it is moved, the routine proceeds to step ST22.

Step ST22

The CPU 17 changes the reproduction order of the music data based on the dropped position after dragging at step ST21.

Step ST23

The CPU 17 decides whether or not a delete instruction is received to the title name data displayed in the reproduction list section 61, when deciding it is received, the routine proceeds to step ST24.

The delete instruction may be generated by dragging the title name data to be deleted while the cursor image 59 is designated on the reproduction list section 61 in the left direction of the screen, or by dragging and dropping the title name data on a dust box image while a predetermined dust box is displayed on the reproduction screen DISP1.

Step ST24

The CPU 17 deletes the title name data, to which the delete instruction is received at step ST23, from the reproduction order list.

Third Operation Example

In this example of the operation, the case where the artist image (AR_1) and the album image (AL_1) are designated in the reproducing music attribute section 62 shown in FIG. 4, will be explained.

Figure 8:
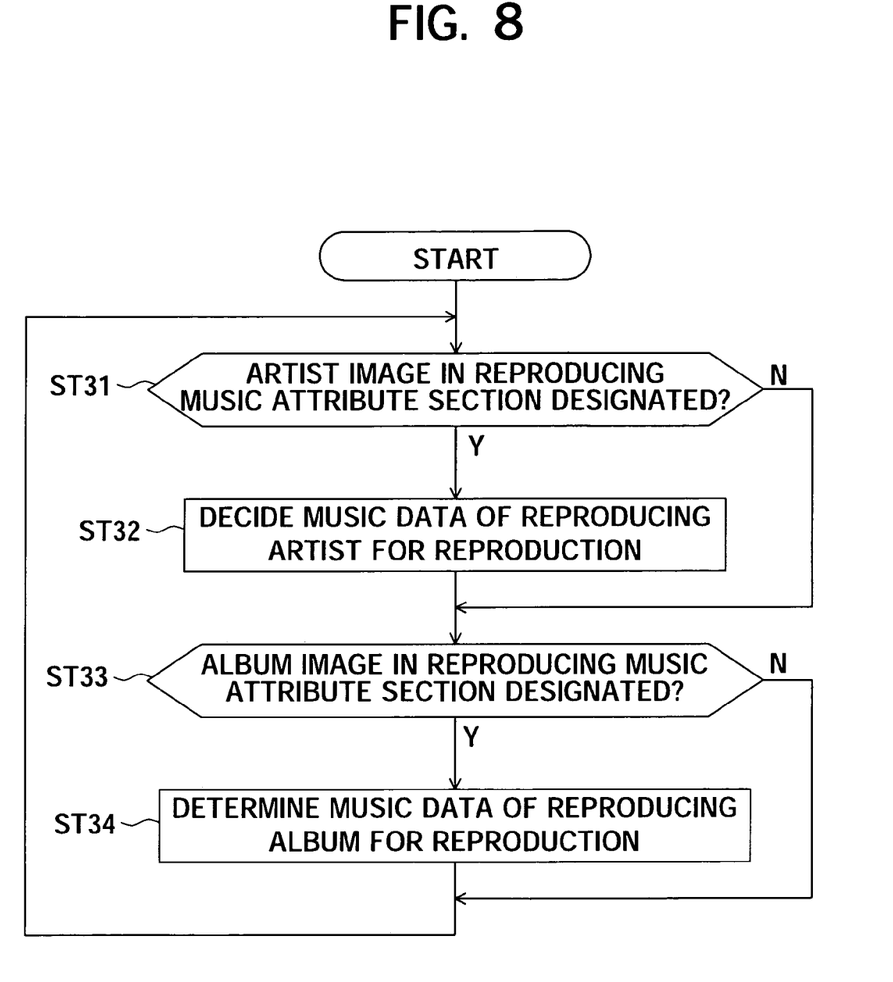
FIG. 8 is a flow chart for illustrating an exemplary operation of the portable audio reproduction apparatus when an artist image and an album image are designated in a reproducing music attribute section shown in FIG. 4.

FIG. 8 is a flow chart for illustrating the example of the operation.

Step ST31

The CPU 17 decides whether or not the artist image is designated in the reproducing music attribute section 62 of the reproduction screen DISP1 shown in FIG. 4, based on the operation signal in response to the touch-panel function of the LCD panel 14, when deciding it is designated, the routine proceeds to step ST32.

Step ST32

The CPU 17 specifies an artist of the reproducing music data for example in shuffled reproduction, and decides the music data of the specified artist to be reproduced in the music data stored in the HDD 13.

The CPU 17 causes the LCD panel 14 to display the title name data of the music data of the specified artist in the reproduction list section 61 in a reproduction order in accordance with the above decision.

Step ST33

The CPU 17 decides whether or not the album image is designated in the reproducing music attribute section 62 of the reproduction screen DISP1 shown in FIG. 4, based on the operation signal in response to the touch-panel function of the LCD panel 14, when deciding it is designated, the routine proceeds to step ST34.

Step ST34

The CPU 17 specifies an album of the reproducing music data for example in the shuffled reproduction, and decides the music data of the specified album to be reproduced in the music data stored in the HDD 13.

The CPU 17 causes the LCD panel 14 to display the title name data of the music data of the specified album in the reproduction list section 61 in the reproduction order in accordance with the above decision.

As explained above, according to the portable audio reproduction apparatus 1, the title name data, the artist name data, and the album name data of the reproducing music data are displayed in the reproducing music attribute section 62, and a table of the music data to be reproduced is displayed in the reproduction list section 61.

The reproduction list section 61 is displayed with the music data to be reproduced subsequent to the reproducing music data and the title name data of an already reproduced music data.

Therefore, according to the portable audio reproduction apparatus 1, a user can know the music data to be reproduced subsequent to the reproducing music data and perform a skip operation before reproducing the following music data if the following music data is not preferable.

Further, the portable audio reproduction apparatus 1 displays in the reproduction list section 61 only the title name data and the reproduction time data (part of the attribute data) of a plurality of the music data to be reproduced, and displays in the reproducing music attribute section 62 the entire attribute data of the reproducing music data.

Therefore, the LCD panel 14 can effectively be utilized in a limited size in terms of displaying a valuable information for a user.

The portable audio reproduction apparatus 1 as shown in FIG. 6 in the shuffled reproduction decides randomly the reproduction order at step ST12, and displays the same on the reproduction list section 61. Therefore, a user knows the reproduction order of the music data selected randomly in advance, and if a music is not preferable, he or she could delete the music data from the reproduction order.

According to the portable audio reproduction apparatus 1, a user's operation for example with drag and drop to the title name data on the reproduction list section 61 results in a change of the reproduction order and a delete of the music data from the reproduction list. Therefore, the reproduction suitable to the user's preference is possible.

Further, according to the portable audio reproduction apparatus 1, by the processing shown in FIG. 8, when a user finds a preference music data in randomly reproduction of the music data in the shuffled reproduction, a music data of the artist or the album associated with the preference music could be reproduced successively.

Second Embodiment

The portable audio reproduction apparatus 1 of the present embodiment is the same as the first embodiment except for part of a processing of the CPU 17 shown in FIG. 1.

In the above first embodiment, as shown in FIG. 4, the reproduction screen DISP1 separately arranged with the reproduction list section 61 and the reproducing music attribute section 62 is displayed on the LCD panel 14.

Figure 9:
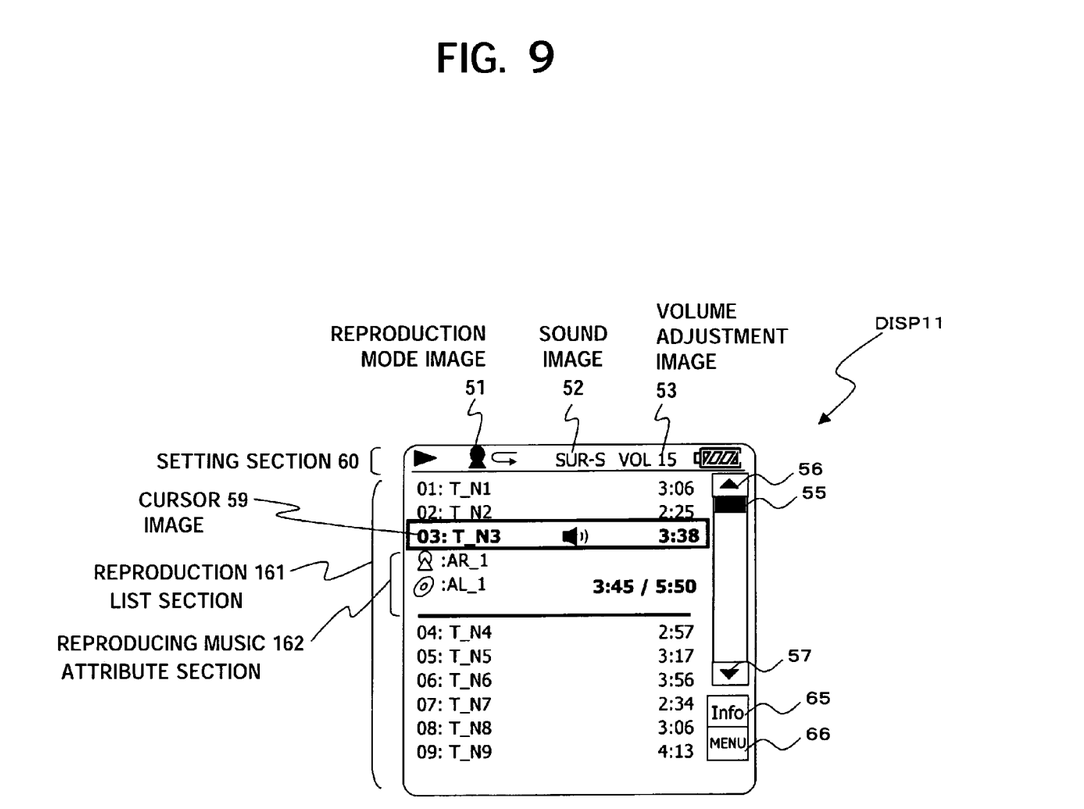
FIG. 9 is a view for illustrating a reproduction screen of a portable audio reproduction apparatus of a second embodiment according to the present invention.

In the present embodiment, a CPU 17a as shown in FIG. 9 causes the LCD panel 14 to display the reproduction screen DISP11 including a reproducing music attribute section 162 in a reproduction list section 161.

The reproduction list section 161 as shown in FIG. 9 is successively displayed (arranged) with the title name data of a plurality of the music data selected for reproduction in the designated reproduction mode.

Further, the reproduction list section 161 is displayed with a reproduction time data of the music data linked to the respective title name data.

The cursor image 59 is displayed on the title name data and the reproduction time data of the reproducing music data in the reproduction list section 161.

The reproduction list section 161 has a function button image 56 for moving the cursor image 59 in the upward direction of the screen, the function button image 57 for moving the same in the downward direction, and the function button image 55 for moving the same by dragging, in the right end portion of the screen in the same way as the first embodiment.

The reproducing music attribute section 162 is displayed in the reproduction list section 161 downwardly adjacent to a portion displaying the title name data of the reproducing music data displayed in the reproduction list section 161, and displayed with the artist name data and the album name data.

Next, an example of the operation in the case where the portable audio reproduction apparatus 1 receives the reproduction instruction, will be explained.

Figure 10:
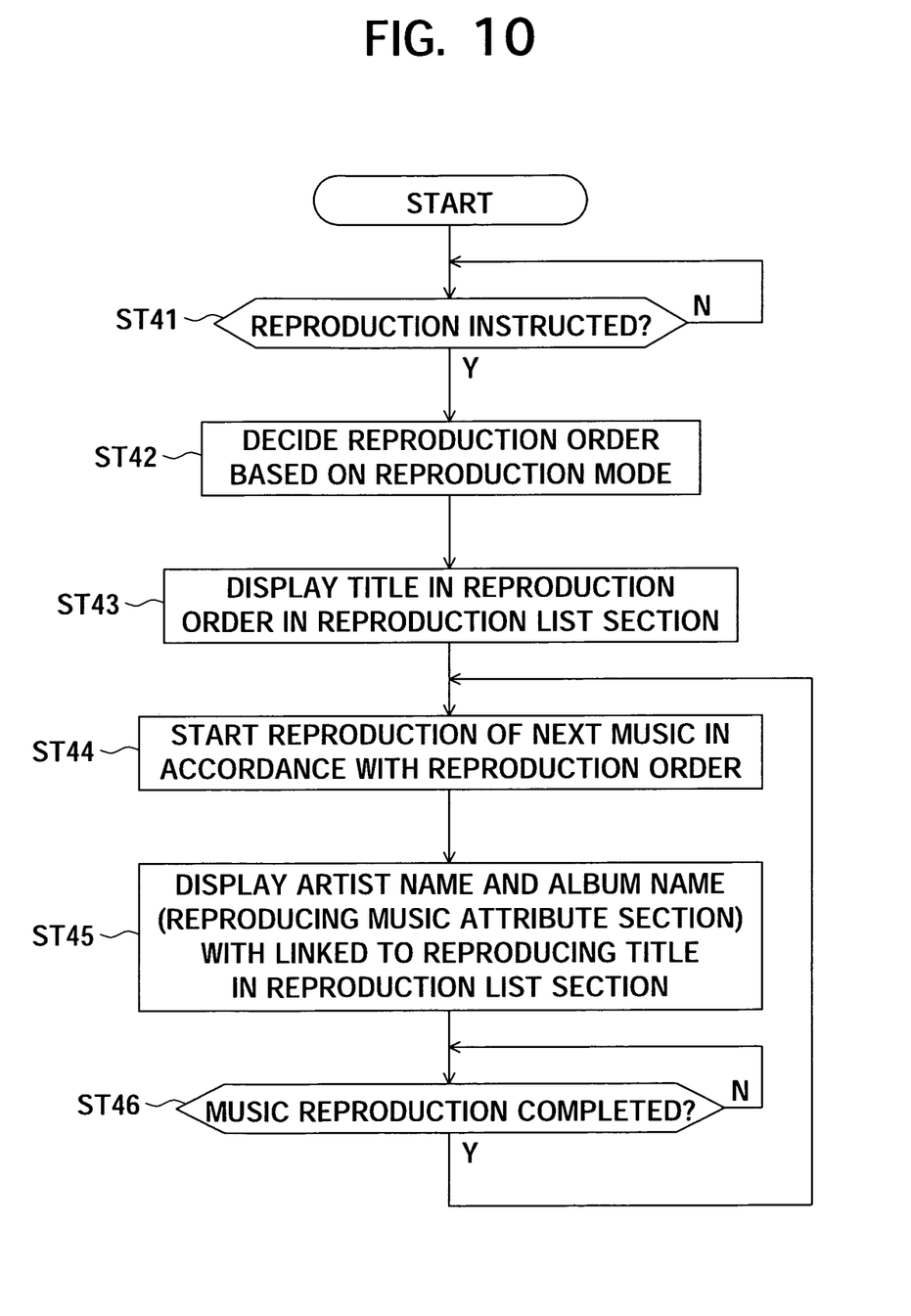
FIG. 10 is a flow chart for illustrating a display operation on the production screen of the portable audio reproduction apparatus shown in FIG. 9.

FIG. 10 is a flow chart for illustrating the example of the operation.

Step ST41

The CPU 17a decides that the reproduction instruction is received as input, the routine proceeds to step ST42.

Step ST42

The CPU 17a for example decides the music data to be reproduced and the reproduction order thereof based on a reproduction mode set by the MENU key 40 shown in FIG. 3 and a hierarchy positioned on the search screen at step ST41 where the reproduction instruction is input.

The CPU 17a, for example when the reproduction instruction is received as input while a predetermined artist is designated on the search screen, decides to reproduce the music data corresponding to the designated artist name in a predetermined order, for example, in the released-day order.

Further, the CPU 17a, when the reproduction instruction is received as input while the shuffled mode is designated, randomly decides the reproduction order of the entire music data stored in the HDD 13.

Step ST43

The CPU 17a causes the LCD panel 14 to display the title name data and the reproduction time data of the music data in the reproduction order decided at step ST42 in the reproduction list section 161 of the reproduction screen DISP11 shown in FIG. 9.

Step ST44

The CPU 17a specifies the following music data to be reproduced subsequent to the reproducing music data in accordance with the reproduction order decided at step ST42, starts the reproduction (decoding) of the specified music data, and outputs the decoded data to the audio output circuit 18.

Step ST45

The CPU 17a as shown in FIG. 9 causes the LCD panel 14 to display in the reproducing music attribute section 162 the artist name data and the album name data of the music data downwardly adjacent to a portion displaying the title name data and the reproduction time data of the reproducing music data in the reproduction list section 161.

Further, the CPU 17a does not cause the LCD panel 14 to display in the reproducing music attribute section 162 an already reproduced music data.

Step ST46

The CPU 17a decides whether or not the reproduction of the music data is completed, when deciding it is completed, the routine returns to step ST44.

According to the present embodiment, the same effect as the first embodiment can be obtained.

The present invention is not limited to the above embodiments.

The above embodiments are illustrated with reference to the case of applying the present invention to a portable audio reproduction apparatus, but the present invention can also be applied to a personal computer or other apparatuses other than a portable type.

Further, the above embodiments are illustrated with reference to a music data or other audio data as a content data, but the invention may also be used with video, photo, or other image data.

Further, the recording means used for storing the content data may be an MD (Registered Trademark) or other magneto-optical recording medium, a recordable CD (CD-R), a recordable DVD (DVD-R), or other optical recording medium or a Memory Stick (Registered Trademark), SD Card (Registered Trademark), or other semiconductor memory instead of the HDD 13 shown in FIG. 1.

Further, the present invention may be applied to a personal computer, a compact disk or other optical disk reproduction apparatus, or other magneto-optical disk reproduction apparatus.

Furthermore, the music data reproduced in the present invention may be a music data other than the music data stored in the recording means of the reproduction apparatus. For example, the music data stored in an exterior server may be reproduced by downloading or streaming through a communication circuit if necessary.

It should be understood by those skilled in the art that various modifications, combinations, sub-combinations and alterations may occur depending on design requirements and other factors in so far as they are within scope of the appended claims or the equivalents thereof.

What is claimed is:

1. A data display method for displaying attribute item information linked to content data on a touch display screen of a portable audio reproduction apparatus, comprising:

displaying, in the touch display screen, a list including a plurality of attribute item information respectively allocated to a plurality of different content data in a first predetermined region spanning a width of the display screen of the portable audio reproduction apparatus;

displaying, in response to selection of an attribute item information from the list, a plurality of attribute item information linked to content data corresponding to the selected attribute item information in a second predetermined region spanning the width of the display screen;

displaying status information of the portable audio reproduction apparatus in a third predetermined region spanning the width of the display screen;

rearranging a reproduction order of a predetermined attribute item information displayed in the list of the plurality of attribute item information via a user operation of touching the predetermined attribute item information in the touch display screen and dragging the predetermined attribute item information to another location on the touch display screen; and reproducing the different content data according to the changed reproduction order, wherein, when a predetermined attribute item information is selected for reproduction from the list, a reproduction order list arranged with the attribute item information of a plurality of different content data in the reproduction order based on the reproduction mode is displayed, and a plurality of other attribute item information linked to the content data corresponding to the selected attribute item information is displayed in a portion adjacent to a position where the selected attribute item information is displayed.

2. The data display method as set forth in claim 1, wherein, when the predetermined attribute item information is selected from the list to reproduce the content data linked thereto, a plurality of additional attribute item information linked to the content data corresponding to the selected attribute item information is displayed, and a reproduction order list arranged with an attribute item information of a plurality of content data in a reproduction order based on a reproduction mode is displayed.

3. The data display method as set forth in claim 2, wherein the reproduction mode is a shuffled reproduction mode and a plurality of attribute item information is displayed in a reproduction order determined randomly.

4. The data display method as set forth in claim 2, wherein the reproduction mode is a mode for reproducing in an order based on released dates of the different content data and a plurality of attribute item information is displayed in the released-date order.

5. The data display method as set forth in claim 1, wherein, when detecting that a predetermined attribute item information is removed from a subject to be reproduced in the list arranged with the plurality of attribute item information in the reproduction order, a reproduction of a content data corresponding to the predetermined attribute item information is avoided.

6. The data display method as set forth in claim 1, wherein, when a predetermined attribute item information is selected in a plurality of other attribute item information linked to the different content data in reproducing a content data corresponding to the attribute item information selected from the list, a list including a plurality of attribute item information associated with the attribute of the selected predetermined attribute item information is displayed in place of the reproduction order list.

7. The data display method as set forth in claim 1, wherein the different content data includes music data,
a list including a track name information of the attribute item information of the music data is displayed in the first predetermined region, and
when a predetermined track name information is selected for reproduction from the list, at least an album name information, an artist name information, and track name information in the music data corresponding to the selected track name information are displayed in the second predetermined region and a reproduction order list arranged with the track names of a plurality of content data in the reproduction order based on the reproduction mode, the reproduction order list being displayed in the first predetermined region.

8. The data display method according to claim 1, wherein the attribute item information is associated with the content data in a table stored in a storage unit of the portable audio reproduction device.

9. The data display method according to claim 1, wherein the third predetermined region is displayed in the top portion of the display screen.

10. The data display method of claim 1, further comprising:
deleting the predetermined attribute item information displayed in the list of the plurality of attribute item information via a user operation of touching the predetermined attribute item information in the touch display screen and dragging the predetermined attribute item information in a predetermined direction.

11. A portable audio reproduction apparatus for reproducing a content data comprising:
a touch display screen;
a reproduction unit configured to reproduce different content data;
a display unit configured to display attribute information associated with the different content data; and
a control unit connected to the display unit through a bus, and configured to cause the display unit to display, in a first predetermined section on the touch display screen, a list including a plurality of attribute item information respectively allocated to a plurality of content data, and, in response to selection of a predetermined attribute item information from the list to reproduced content data, cause the display unit to display in a second predetermined section a plurality of other attribute item information linked to a content data corresponding to the selected attribute item information, and configured to cause the display unit to display in a third predetermined section portable audio reproduction apparatus status information,
the control unit further configured to:
rearrange a reproduction order of the predetermined attribute item information displayed in the list of the plurality of attribute item information via a user operation of touching the predetermined attribute item information in the touch display screen and dragging the predetermined attribute item information to another location on the touch display screen, and
reproduce the different content data according to the changed reproduction order, wherein the control unit causes the display unit to display a reproduction order list arranged with an attribute item information of a plurality of different content data in a reproduction order based on the reproduction mode and to display a plurality of other attribute item information linked to the content data corresponding to the selected attribute item information in a portion adjacent to a position where the selected attribute item information is displayed.

12. The portable audio reproduction apparatus as set forth in claim 11, wherein the control unit, when detecting that the predetermined attribute item information is selected for reproduction from the list, causes the display unit to display a reproduction order list arranged with an attribute item information of a plurality of different content data in a reproduction order based on a reproduction mode and to display a plurality of other attribute item information linked to a content data corresponding to the selected reproduction information in part of the predetermined section.

13. The portable audio reproduction apparatus as set forth in claim 12, wherein the reproduction mode is a shuffled reproduction mode and a plurality of attribute item information is displayed in a reproduction order determined randomly.

14. The portable audio reproduction apparatus as set forth in claim 12, wherein the reproduction mode is a mode for reproducing in an order based on released days of the content data, and a plurality of attribute item information is displayed in the released-day order.

15. The portable audio reproduction apparatus as set forth in claim 11, wherein, when detecting that a predetermined attribute item information is removed from a subject to be reproduced in the reproduction order list, the control unit avoids a reproduction of a content data corresponding to the predetermined attribute item information.

16. The portable audio reproduction apparatus as set forth in claim 11, wherein, when detecting that a predetermined attribute item information is selected in a plurality of attribute item information linked to a reproducing content data in reproducing the content data corresponding to the attribute item information selected from the list, the control unit causes the display unit to display a list including a plurality of attribute item information associated with an attribute of the selected predetermined attribute item information in place of the reproduction order list.

17. The portable audio reproduction apparatus as set forth in claim 11, wherein the reproduction unit reproduces a music data, and
the control unit causes the display unit to display a list including a track name information indicating a track name of the music data, and, when detecting that a predetermined track name information is selected for reproduction from the list, to display at least an album name information and an artist name information of the music data linked to the selected track name information and to display a reproduction order list arranged with a track name of a plurality of content data in a reproduction order based on the reproduction mode.

18. The portable audio reproduction device according to claim 11, further comprising:
a storage unit configured to store a table associating the attribute item information with the content data.

19. The portable audio reproduction device according to claim 11, wherein the control unit is configured to display the third predetermined section in the top portion of the display unit.

* * * * *